United States Patent [19]

Kobayashi et al.

[11] Patent Number: 5,303,544
[45] Date of Patent: Apr. 19, 1994

[54] GAS TURBINE SYSTEM WITH A TUBE-NESTED COMBUSTION CHAMBER TYPE COMBUSTOR

[75] Inventors: Hiroshi Kobayashi; Yoshiharu Ueda; Masamichi Yamamoto; Keiryo Tou, all of Yasu; Seikan Ishigai, Ashiya; Sentaro Miura; Kiyoshi Furushima, both of Tokyo, all of Japan

[73] Assignee: Hirakawa Guidom Corporation, Osaka, Japan

[21] Appl. No.: 922,461

[22] Filed: Jul. 30, 1992

[30] Foreign Application Priority Data

Sep. 3, 1991 [JP] Japan .................. 3-253025

[51] Int. Cl.⁵ .......................... F02C 3/30; F02C 6/18
[52] U.S. Cl. ....................... 60/39.182; 60/39.55
[58] Field of Search ........... 60/39.07, 39.182, 39.55; 122/7.R, 7.B

[56] References Cited
U.S. PATENT DOCUMENTS

| | | | |
|---|---|---|---|
| 2,154,481 | 4/1939 | Vorkauf ................ | 60/39.182 |
| 2,294,700 | 9/1942 | Stroehlen ............. | 60/39.182 |
| 3,335,565 | 8/1967 | Aguet .................. | 60/39.182 |
| 3,969,891 | 7/1976 | Aguet .................. | 60/39.182 |
| 5,020,479 | 6/1991 | Suesada et al. . | |
| 5,050,541 | 9/1991 | Kobayashi et al. . | |

*Primary Examiner*—Louis J. Casaregola
*Attorney, Agent, or Firm*—Wenderoth, Lind & Ponack

[57] ABSTRACT

With a view toward solving various problems of prior-art gas turbine plants by applying a tube-nested combustion chamber type combustor in place of the combustor of the prior-art gas turbine, a combustor of a gas turbine used in a gas turbine power plant is equipped with a heat-absorber-water-tube-inserted combustion chamber in which fuel is burnt with combustion air only. Consequently, the $NO_x$ generated from the gas turbine power plant is notably reduced, no CO and unburnt hydrocarbons (UHC) are produced and, moreover, the amount of power generated and the utilizable calories of the steam are increased for the benefit of an enhanced overall heat efficiency. This enables the combustion space of the gas turbine power plant to be greatly diminished, with a resultant widened utilization range of gas turbines.

12 Claims, 5 Drawing Sheets

GAS TURBINE SYSTEM WITH A TUBE-NESTED COMBUSTION CHAMBER TYPE COMBUSTOR

BACKGROUND OF THE INVENTION AND RELATED ART STATEMENT

1. Field of the Invention

The present invention relates to the improvement of conventional combustors by applying a tube-nested combustion system, which has a remarkable effect when applied to the combustion chamber of an ordinary boiler, to other types of combustors, in particular to those of an ordinary gas turbine system. The invention also relates to a great expansion of the field application of gas turbine equipment with such an improvement.

2. Description of the Prior Art

The features of combustors of conventional gas turbines are as follows. A gas turbine system is now widely used for electric generation and for industrial uses, or for a gas turbine - steam turbine combined cycle, or so-called gas turbine cogeneration. There are the following problems common to all of these gas turbine systems. The first problem is that, since the higher the gas temperature is at the inlet, the higher the thermal efficiency, as indicated by the so-called Carnot's theoretical efficiency, the temperature of the inlet gas which flows into the space around the blades of the gas turbine should be raised so far as is practical. In the present situation, however, for example, the gas temperatures around the turbine blades and the gas turbine inlet are controlled to 990°-1,100° C., so as to reduce the heat resistance as well as the heat loss due to the raised temperature of each part of the turbine blades and the combustor. Indeed, if complete combustion were made in the vicinity of the stoichiometric air ratio, the combustion temperature of the so-called fossil fuel would be on the order of 2,130° C. In practice, however, the combustor and the turbine blades will not serve their practical ends unless their temperatures are lowered. On this account, of the air supplied into the combustor, the air which participates in the actual combustion, or the so-called combustion air, is only about 35-40% of the total. Another about 20% is charged in as dilution air for reducing the temperature of the combustion gas, and the balance of 40% is fed in as the cooling air for the prevention of damage by fire to each part of the combustor and the turbine blades, etc. This represents the bench mark of the present technology.

The aforementioned first problem is quite an important problem. The temperature of the combustion gas, which has once been elevated, is lowered with the dilution air. On the other hand, the cooling air is used for raising the heat resistive temperatures of the combustor and the turbine blades, etc. This involves, besides the large exergy (irreversible) loss due to the cooling of combustion gas with the dilution air, decrease of turbine work resulting from part of air that does not serve as the cooling air, aerodynamic characteristic loss caused by blowing the cooling air out through the blade surface and the walls of flow paths of the combustor, the turbine. and the like, pumping loss of the moving blade cooling air, the loss due to the fact that the cooling air comes to mix with the main stream gas so that the main stream gas is cooled, and so on. Further, there occurs an increase in the pressure loss resulting from an increased amount of combustion gas or a large exergy loss. The sum of all these losses well exceeds about 10%, as converted to the turbine work. Such a loss greatly offsets the benefits in the output and the thermal efficiency which otherwise would be expected to accrue from the raised gas temperature. What is more important, in the present situation heat recovery is made later from the combustion exhaust gas, swollen by a large amount of dilution air and cooling air as described above, which can be said to actually be a serious matter, as compared with normal boilers, in which the combustion is made with an exhaust gas containing 1-3% $O_2$, 3-5 times as large an amount of exhaust gas is required. As a result, 3-5 times as large a volume is required for all equipment located downstream, including a waste heat boiler, ducts, de-$NO_x$ equipment and chimneys, etc., resulting in a marked economical disadvantage. Conversely, any ingenious contrivance could possibly reduce the combined cycle or cogeneration in the present situation to less than $\frac{1}{3}$-1/5 in volume.

A more important fact is that as the gas temperature at the turbine blade inlet goes up above 1,300° C., the necessary volume of cooling air needs to be drastically cut down from the present level. Accordingly, not only some innovation in the technique for cooling turbine blades, etc., is desired, but other techniques corresponding to this one, such as water cooling or steam cooling, are necessary.

The second problem is that of heat loss. Since about 3-5 times as large an amount of dilution air and cooling air as that of the combustion air of the normal boiler is charged in for reducing the combustion gas temperature, as described above, the amount of the exhaust gas increases 3-5 fold. Consequently, elements of the equipment should be increased to 3-5 times in size, with a correspondingly large heat radiation loss, and besides, the heat loss accounted for by the exhaust gas itself runs 3-5 times as large. Thus, conversely, such heat loss and exhaust gas loss could possibly be reduced to $\frac{1}{3}$-1/5 of that in the present state by some ingeneous means. As described above, the oxygen ($O_2$) concentration % in the exhaust gas from a gas turbine reaches 15-16%. In the present state, since the combustion temperature in the combustor is high, the concentration of $NO_x$ generated is high, being 95-240 ppm ($O_2$=16%) or 400-1,000 ppm, as converted to that at 0% $O_2$, in normal city gas (13A) under the present unsuppressed state. How large this amount should be regarded may be discerned from the fact that the boiler's $NO_x$ concentration is regulated to be 60-200 ppm, as converted to that at 0% $O_2$.

As a third problem, in a gas turbine plant (the so-called combined cycle or cogeneration) of this type, particularly, hereafter attachment of large de-$NO_x$ equipment will be indispensable, making problems involving its cost, dimensions and space, etc., important. These problems will probably increase in importance from now on because of the growing demand of users for elevating the gas turbine inlet temperature.

Where a fourth problem is concerned, in a conventional gas and steam turbine combined cycle, or cogeneration, $O_2$ in the exhaust gas is as high as about 15-16%. Its discharge is uneconomical. Accordingly, there has been taken a measure in which a duct burner is placed on the upstream side of the waste heat boiler and fuel is fed therein, to be burned, using the residual $O_2$ in the exhaust gas, to raise the combustion gas temperature, thereby increasing the amount of steam recovered from the waste heat boiler. According to this system, however, a large duct burner and a long duct as its burner chamber equivalent are required. Besides, the potential temperature rise is limited by the factors of the heat resistance of these parts the and that heat loss and the outlet $O_2$ concentration can be reduced to only about 10%. Thus in the final analysis, the exhaust gas must be released at a high $O_2$%, as it is, without recovering the exhaust gas heat loss.

SUMMARY OF THE INVENTION

Since the conventional combustor of gas turbines involves various problems as described hereabove, one object is to set the gas temperature to a predetermined point while reducing the dilution air or the cooling air in the combustor and the gas turbine. For example, if the combustor, with the present state of its outlet gas temperature being 1,100° C., $O_2$ concentration 16%, and $NO_x$ 200 ppm (840 ppm at 0% $O_2$) is modified into one that operates at 1,100° C., 4% $O_2$ and 50 ppm $NO_x$ (62 ppm at 0% $O_2$), the technique of the conventional gas turbine may be used without modification, whereby the output and the thermal efficiency both will both be greatly improved. In this way, a gas turbine will emerge, with various problems largely solved, which is of advanced and facile design and which permits a wide range of applications. The object of the present invention is to solve the various problems described hereabove.

BRIEF DESCRIPTION OF SEVERAL VIEWS OF THE DRAWINGS

The above and other objects and features of the present invention will become apparent from the following description taken in conjunction with a preferred embodiment thereof with reference to the accompanying drawings, in which.

DETAILED DESCRIPTION OF THE PREFERRED EMBODIMENTS

In solving the above-described problems, according to the present invention fuel is burnt with the combustion air only and cooling for adjusting the outlet exhaust gas temperature is by use of the tube-nested combustion of this invention without feeding large amounts of dilution air and cooling air, besides the combustion air for adjusting the outlet gas temperature, as in the conventional combustor.

Thus according to this invention, a water tube bundle (tube nest) is placed inside a combustor in the manner as disclosed by Japanese Patent Laid-Open Publication Nos. Hei 2-272207 and 178502. Fuel is burnt around this water tube bundle, with the outlet gas temperature preset to be a desired temperature for the gas turbine, and the oxygen $O_2$ concentration in the combustion gas is about 1-3%, similar to the $O_2$ concentration of the combustion chamber outlet gas of the ordinary boiler. In this way, the combustion temperature in the combustor of this invention can be set to a constant temperature of about 900°-1,200° C., so that the gas may be discharged at the temperature and flow rate desired to have at the gas turbine located downstream. Combustion heat transfer and cooling are then continuously performed. Consequently, the amount of $NO_x$ generation is small, no CO is produced and not only can the desired gas turbine inlet gas conditions be achieved, but the heat of combustion that is absorbed by the water tube bundle yields high temperature and pressure steam. To that extent, the amount of power generated and the amount of usable heat the steam are increased, thus eventually resulting in the total of the usable heat of the steam being increased, and thus eventually resulting in improved total heat efficiency.

EXAMPLES

In the following, the present invention is described with reference to the accompanying drawings.

Figure 8:
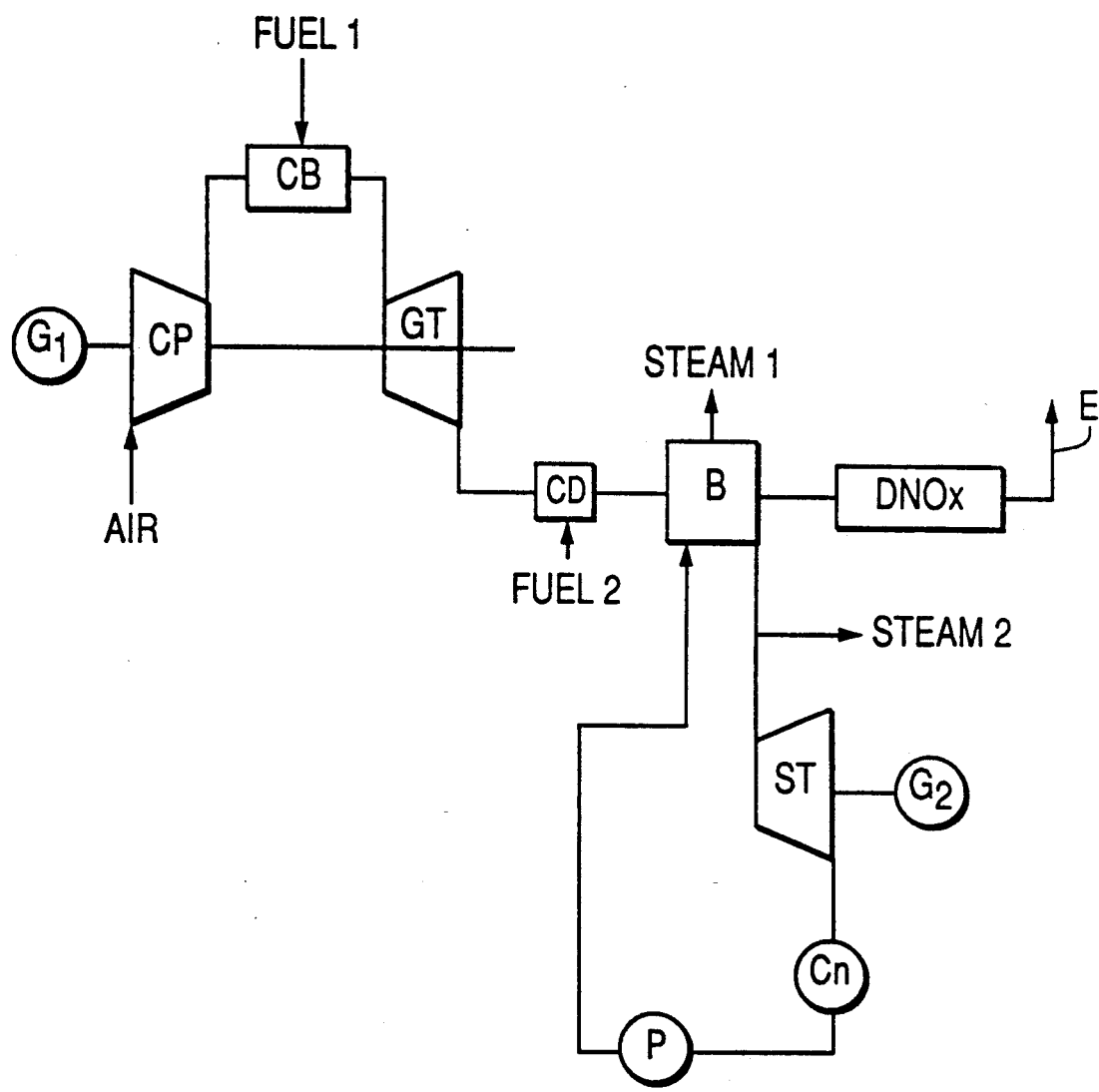
FIG. 8 is a schematic diagram of a prior art gas turbine system.

FIG. 8 illustrates a prior art type gas turbine - steam turbine combined cycle, in which G1 denotes a first generator, CP a compressor, CB a combustor, GT a turbine, CD an after-burning burner, B an exhaust gas heat recovering boiler, $DNO_x$ de-$NO_x$ equipment, ST a steam turbine, G2 a second generator, Cn a condenser, P a boiler feed water pump, Steam 1 and Steam 2, respectively, steam for process and steam for heating; and E an exhaust gas duct to a chimney. Fuel 1 designates the fuel fed into the combustor and Fuel 2 designates the fuel fed to the after-burning burner CD.

Figure 1A:
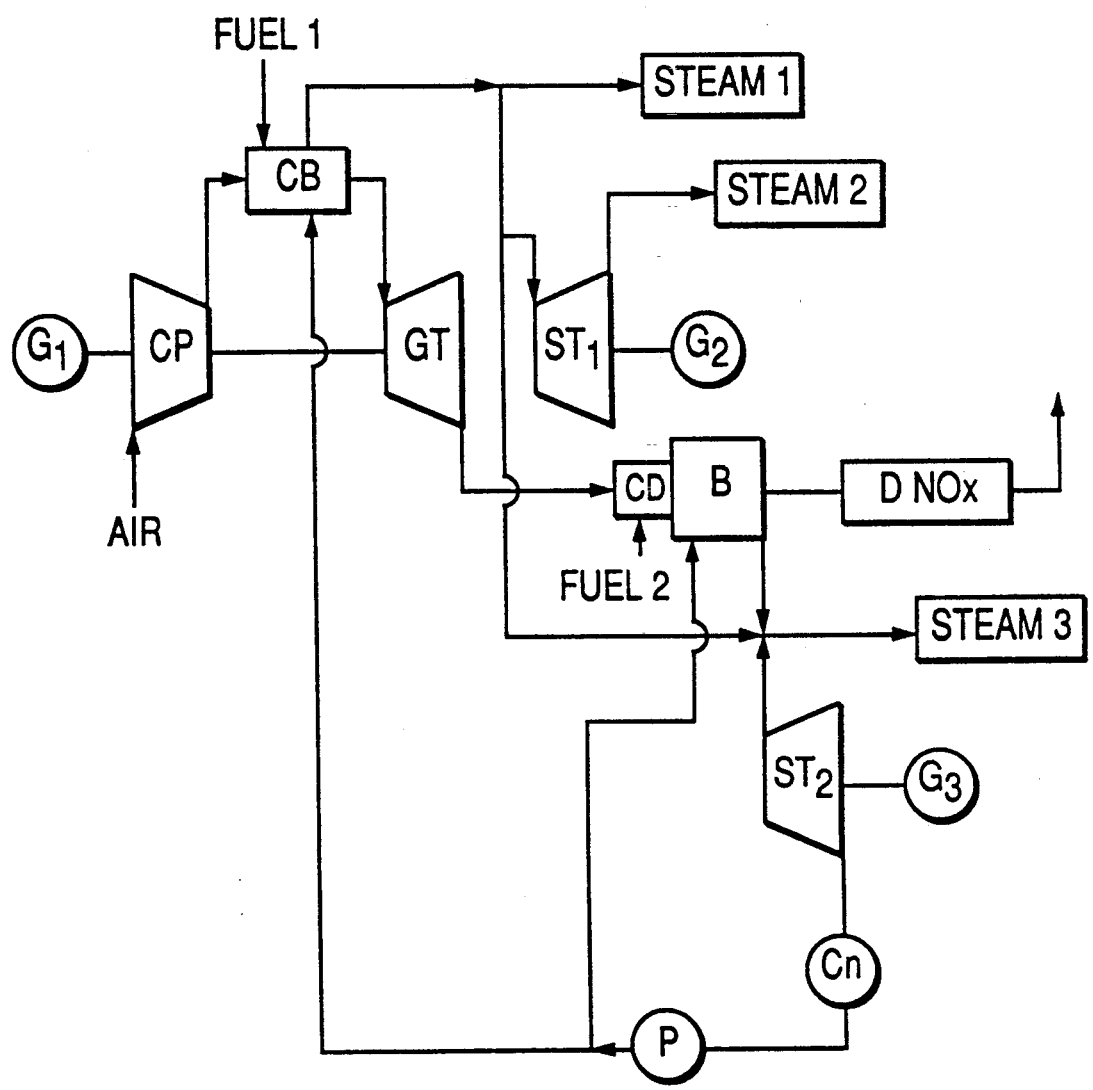
FIGS. 1A and 1B are schematic diagrams of gas turbine systems equipped with tube-nested combustion chamber type combustors embodying the present invention.
Figure 1B:
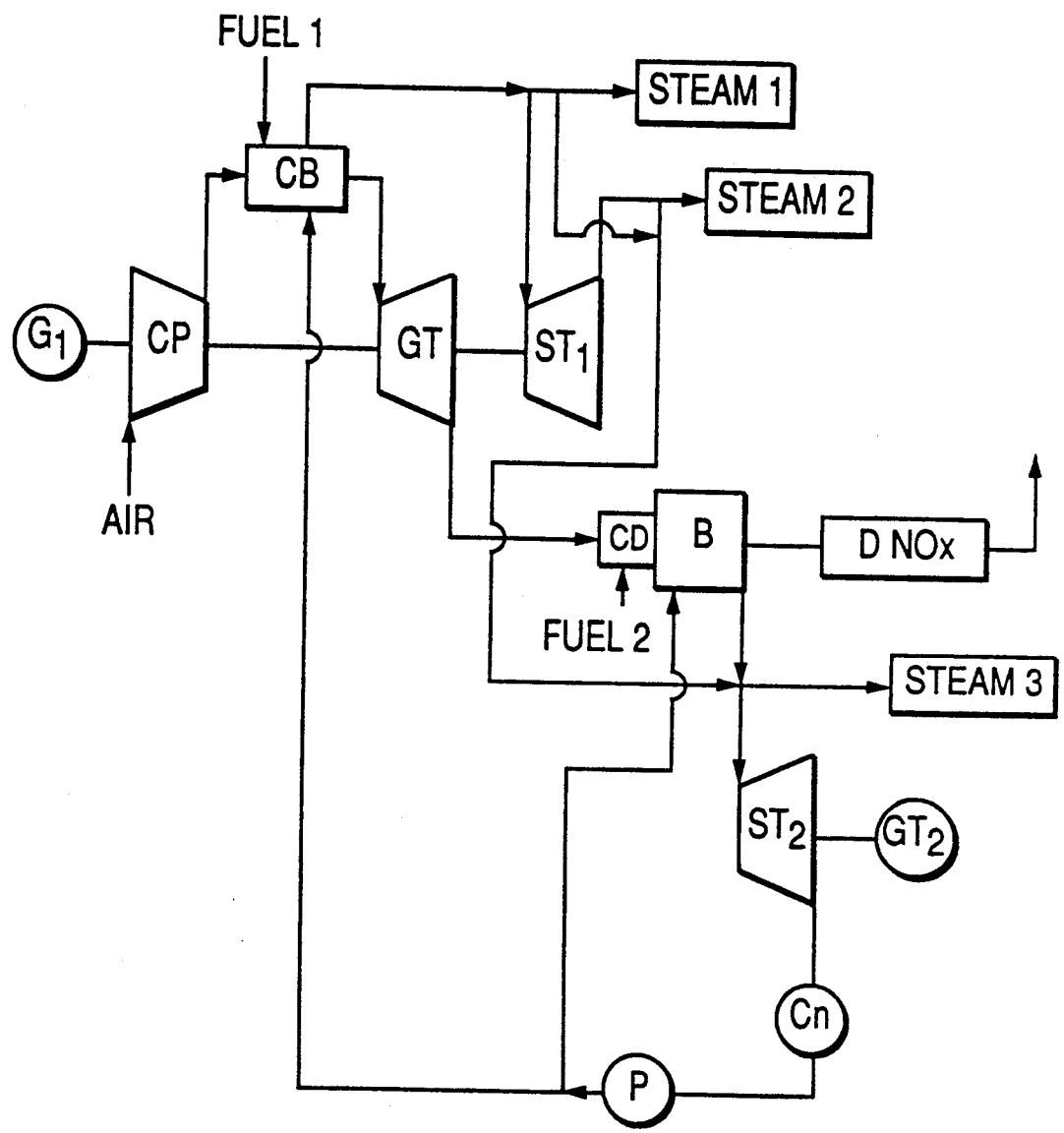
Figure 2:
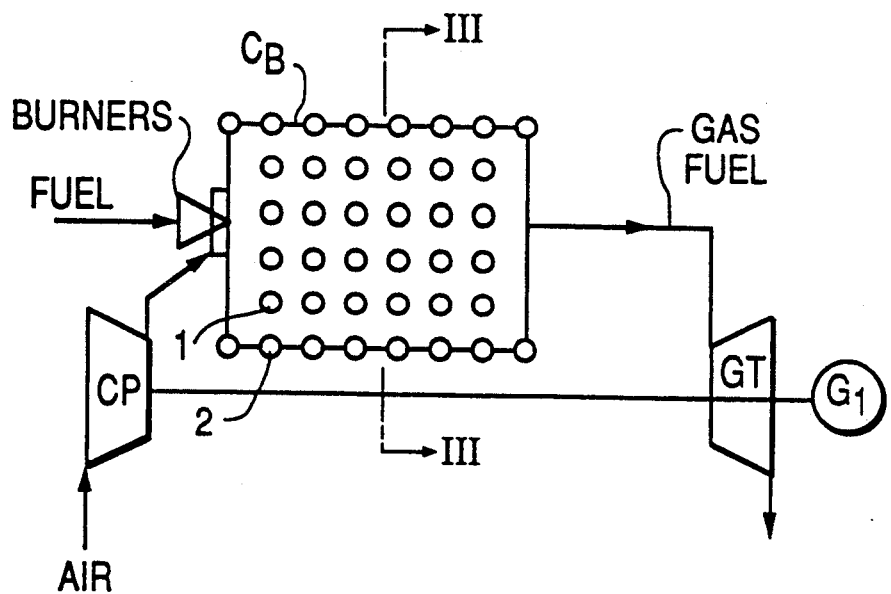
FIG. 2 is a tube-nested combustion chamber type combustor embodying the present invention.
Figure 3:
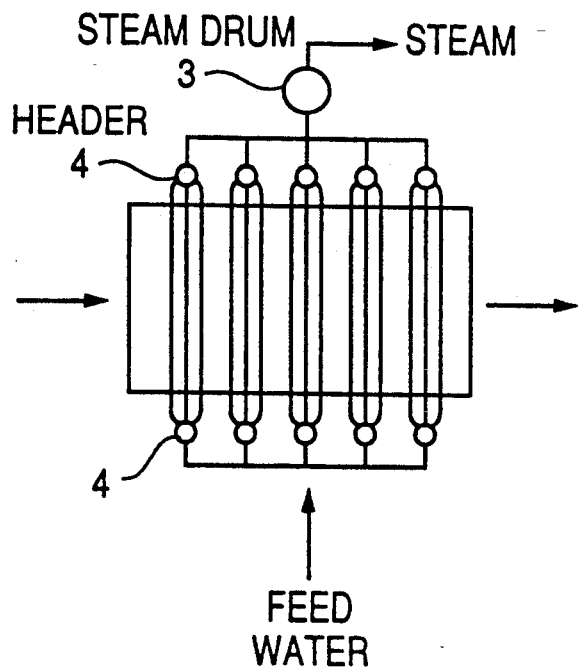
FIG. 3 is a cross-sectional view taken along line III—III in FIG. 2.

FIGS. 1A and B illustrate embodiments of this invention, being gas turbine plants equipped with tube-nested combustion chamber type combustors. CB represents a tube-nested combustion chamber type combustor constituting the mainstay of this invention. The steam generated here is fed into a steam turbine ST1 having a separate shaft from that of GT in the embodiment of FIG. 1A, to generate power also by GT at G1. Further, the steam generated from a waste heat boiler B located downstream is singly fed to another steam turbine ST2, also generate power by a generator G3. In this instance, a system for feeding the steam from CB to the steam turbine ST2, together with the steam from the waste heat boiler B, may be composed. In the embodiment of FIG. 1-B, the steam generated by the tube-nested combustion chamber type combustor CB is fed to a steam turbine ST1 having a shaft in common with that of GT to enable power generation by the generator G1. Or it may be combined with the steam generated by the waste heat boiler B (the arrangement not shown in this diagram), to turn a generator G3 with the steam turbine ST2. Or in the system of FIG. 2, the steam generated by CB may be raised to a still higher pressure, to lead it to ST2 after the steam turbine ST1. This condition may be selected on a cycle basis of the combined cycle. In the cycle of this type the heat-to-electricity ratio should be changed according to the amount of power generation required and the demand heat, so that composite cycles which match to the respective ratios may be set up to make the supply to each turbine or Steam 1, 2 and 3, etc. be in accordance with the demand of heat or the necessary pressure level of the steam. In this instance, by turning the waste heat boiler B into a tube-nested combustion system with an assist burner CD attached, similar to the combustor CB, the heat-to-electricity ratio may be further altered, for the benefit of a widened application range. An embodiment of the tube-nested combustion chamber type combustor which is the mainstay of this invention is shown in FIG. 2, the idea of invention being based on the concept disclosed by Japanese Patent Laid-Open Publication No. Hei 2-272207 "Water Tube Type Boiler and the Method of Combustion Thereof" and Japanese Patent Laid-Open Publication No. Hei 2-178502 "Boiler Provided with Water Tube Bundle." An embodiment having a single stage of the former (Japanese Patent Laid-Open Publication No. Hei 2-272207) is the arrangement of FIG. 2 of this invention. Thus, referring to FIG. 2, CB denotes the tube-nested combustion chamber type combustor. In this embodiment, the combustion chamber is in a single stage. In this embodiment, 1 designates in-furnace heat-absorber water tubes, 2 furnace wall water-cooling tubes, 3 a steam drum (FIG. 3), 4 a tube header; and 5 a burner. FIG. 3 represents a sectional view of the combustor of FIG. 2.

Figure 4:
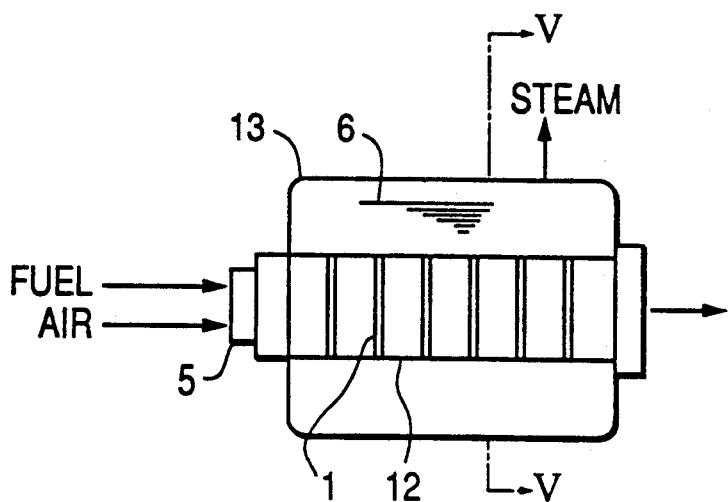
FIG. 4 is another tube-nested combustion chamber type conductor embodying the present invention.

FIG. 4 represents another embodiment of this invention, reference no. 12 showing the outer periphery of the combustion chamber, 13 the outer periphery of the boiler, and 6 the water level.

Figure 6:
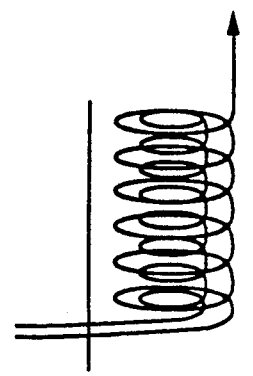
FIG. 6 is still another tube-nested combustion chamber type combustor of the present invention.
Figure 5:
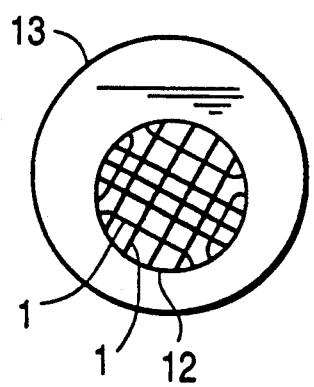
FIG. 5 is a sectional view taken along line V—V of FIG. 4.
Figure 7:
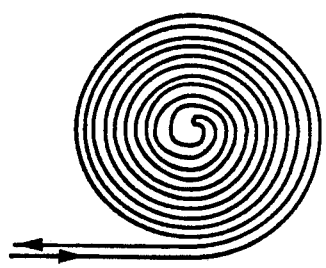
FIG. 7 is an embodiment of a coil-like water pipe placed inside the tube-nested combustion chamber type combustor or FIG. 6.

FIG. 5 is a sectional view taken along line V—V of FIG. 4. FIG. 6 shows a coil-like water tube representing still another embodiment of the combustor of this invention built on a system comprising a water tube placed inside the combustion chamber and the water-cooled circumferential wall using coil-like water tubes. FIG. 7 shows another embodiment with a coil-like water tube located inside the tube-nested combustion chamber type combustor.

The effects of this invention are summarized as follows:

Since the combustion temperature inside the combustor of this invention is constant, being about 900°–1,200° C., the amount of $NO_x$ generated from the combustor is small and no CO and (UHC) are produced. Further, by employing the combustor of this invention, the amount of power generation and the utilizable calories of the steam are an increased for the benefit of increased to total heat efficiency. Moreover, the combustion space may be notably reduced and, accordingly, the space occupied by the overall equipment diminished, to the advantage of widening the application range of gas turbines.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A gas turbine plant, comprising:
    a gas turbine having a predetermined preferred operating temperature range;
    a waste heat boiler connected to said gas turbine downstream thereof for using the waste heat of exhaust gases from said gas turbine to generate steam; and
    a combustor, connected to said gas turbine upstream thereof, receiving fuel and combustion air and burning the fuel to generate combustion gases so as to drive said gas turbine with the combustion gases from said combustor, said combustor comprising a combustion chamber and a means for cooling the combustion gases to a temperature within said predetermined range prior to the combustion gases entering said gas turbine without feeding dilution air or cooling air into the combustion gases, said means comprising a heat-absorption water-tube in said combustion chamber.

2. The gas turbine plant of claim 1, wherein said heat-absorption water-tube is positioned in said combustion chamber such that the fuel is burnt around said heat-absorption water-tube.

3. The gas turbine plant of claim 1, wherein said waste heat boiler has a burner attached thereto for receiving additional fuel and a combustion chamber having a heat-absorbing water-tube disposed therein.

4. The gas turbine plant of claim 1, wherein said heat-absorption water-tube of said combustion chamber is connected to a steam turbine such that steam generated in said combustion chamber drives said steam turbine.

5. The gas turbine plant of claim 4, wherein said waste heat boiler is connected to a second steam turbine such that the steam generated in said waste heat boiler drives said second steam turbine, said gas turbine and both said steam turbines being connected to generators.

6. The gas turbine plant of claim 1, wherein:
    said gas turbine is connected to a first generator and a compressor compressing air delivered to said combustor for driving both said first generator and said compressor;
    said combustor has said heat-absorption water-tube connected to a first steam turbine for driving said first steam turbine with steam generated in said combustion chamber; and
    said waste heat boiler is connected to a second steam turbine for driving said second steam turbine with steam generated in said waste heat boiler.

7. The gas turbine plant of claim 6, wherein:
    said combustor has said heat-absorption water-tube additionally connected to said second steam turbine for driving said second steam turbine with steam from both said heat-absorption water-tube and said waste heat boiler.

8. The gas turbine plant of claim 6, wherein:
    said first steam turbine has a steam outlet connected to the steam inlet of said second steam turbine.

9. The gas turbine plant of claim 6, wherein:
    first and second steam turbine are connected to respective second and third generators.

10. The gas turbine plant of claim 6, wherein:
    said first steam turbine is also connected to said generator.

11. The gas turbine plant of claim 6, wherein:
    said waste heat boiler has a burner attached thereto for receiving additional fuel and a combustion chamber having a heat-absorbing water-tube disposed therein, said heat-absorption water-tube generating the steam to drive said second steam turbine.

12. The gas turbine plant of claim 1, wherein a plurality of heat-absorption water-tubes extend through said combustion chamber.

* * * * *